US005698296A

United States Patent [19]

Dotson et al.

[11] Patent Number: 5,698,296

[45] Date of Patent: Dec. 16, 1997

[54] BUSINESS DOCUMENT HAVING SECURITY FEATURES

[75] Inventors: Mark Dotson; Rajendra Mehta, both of Dayton; William F. Pinell, Lebanon; William M. Saluke, Dayton, all of Ohio

[73] Assignee: The Standard Register Company, Dayton, Ohio

[21] Appl. No.: 571,140

[22] Filed: Dec. 12, 1995

Related U.S. Application Data

[63] Continuation-in-part of Ser. No. 876,105, Apr. 30, 1992, which is a continuation of Ser. No. 339,972, Apr. 18, 1989, abandoned.

[51] Int. Cl.[6] .......... B32B 3/00

[52] U.S. Cl. .......... 428/195; 428/204; 428/219; 428/341; 428/342; 428/402; 428/402.2; 428/913; 503/200; 283/95

[58] Field of Search .......... 346/135.1, 159, 346/160.1; 428/195, 323, 537.5, 913, 914, 204, 219, 341, 342, 402, 402.2; 430/126; 503/200; 283/95

[56] References Cited

U.S. PATENT DOCUMENTS

| | | | |
|---|---|---|---|
| 3,357,930 | 12/1967 | Marks et al. . | |
| 3,493,412 | 2/1970 | Johnston et al. . | |
| 3,873,354 | 3/1975 | Walters . | |
| 3,933,489 | 1/1976 | Walters . | |
| 4,003,245 | 1/1977 | Ogata et al. | 73/88 R |
| 4,016,099 | 4/1977 | Wellman et al. . | |
| 4,296,171 | 10/1981 | Imai . | |
| 4,894,306 | 1/1990 | Schubring . | |
| 4,942,410 | 7/1990 | Fitch et al. . | |
| 5,017,416 | 5/1991 | Imperial et al. . | |
| 5,045,426 | 9/1991 | Maierson et al. . | |
| 5,209,515 | 5/1993 | Dotson et al. . | |
| 5,250,492 | 10/1993 | Dotson et al. . | |
| 5,344,191 | 9/1994 | Chang et al. . | |
| 5,401,060 | 3/1995 | Chang et al. . | |
| 5,427,415 | 6/1995 | Chang . | |

FOREIGN PATENT DOCUMENTS

| | | |
|---|---|---|
| 57/4057 | 1/1982 | Japan . |
| 57/70537 | 5/1982 | Japan . |
| 57/204058 | 12/1982 | Japan . |
| 61/170748 | 8/1986 | Japan . |
| 1353372 | 5/1974 | United Kingdom . |
| 2085806 | 5/1982 | United Kingdom . |

OTHER PUBLICATIONS

"The Evolution of Toning Technology: Past, Present and Future," Fourth Annual Guide to Ribbons and Toner, Datek Information Services, Inc., 1983.

"New Papers for New Printers", Chemtech (1986).

"A Review of Dry and Liquid Toner Technology", The 1988 Datek Imaging Supply Manual.

"Reduction of Toner Disturbances by the Use of Sodium Sulfate", Xerox Disclosure Journal, vol. 2, No. 3, 1977.

*Primary Examiner*—William Krynski
*Attorney, Agent, or Firm*—Killworth Gottman Hagan & Schaeff LLP

[57] ABSTRACT

A security coating for business documents printed using noncontact as well as impact printing devices is provided which enhances the adhesion of toner particles and/or ink to a document substrate. Other security features may be also be added to the coating to provide a dual-function coating which also provides visible evidence of tampering, either by the application of solvents, mechanical abrasion, heat, or when pressure is applied.

13 Claims, 2 Drawing Sheets

BUSINESS DOCUMENT HAVING SECURITY FEATURES

CROSS REFERENCE TO RELATED APPLICATIONS

This application is a continuation-in-part of U.S. application Ser. No. 07/876,105 filed Apr. 30, 1992, pending, the disclosure of which is incorporated by reference, which application is a continuation of U.S. application Ser. No. 07/339,972, filed Apr. 18, 1989, now abandoned.

BACKGROUND OF THE INVENTION

The present invention relates to business documents in sheet or web form having enhanced security features, and more particularly, to security features including a coating which enhances the adhesion of toner or ink printed on a business document and a coating which provides a visible indication of attempted alterations of the document. The coatings may be combined to provide a plurality of security functions on a single document.

Business forms, labels, and security documents are printed on a wide variety of commercial printing devices. Traditional mechanical impact printers have been used in the past for many of these applications, especially in the imprinting of information on security documents such as checks. The inks used with most impact printers adhere well to a document due to the partial penetration of the ink into the surface of the document substrate. In addition, dyes or other indicators have been incorporated in the ink or paper substrate during manufacture, applied as a post-manufacturing surface treatment, or applied as covert images. Thus, detection of attempts at fraudulent alteration of such documents has been relatively easy because the substrate surface is usually disrupted or becomes discolored.

However, with the advance of microcomputer technology, a number of faster printing methods have been developed to take advantage of the high-speed printing output which is now possible. Noncontact printers are fast, quiet, and potentially more reliable because of fewer moving parts. Laser and ion deposition printers are two classes of these newer noncontact printers. These printers use electrostatically charged powdered toner particles which are fused to a substrate by heat, pressure, or a combination thereof. Descriptions of noncontact printers such as laser and ion deposition printers, the toners used therein, and the papers used for printing on them are known. See, for example, "New Papers for New Printers," Chemtech (1986), the disclosure of which is hereby incorporated by reference.

While noncontact printers are fast and quiet, there have been significant limitations which have prevented their wide use in printing certain types of documents such as checks and other security documents, labels, and documents having bar code information thereon. These limitations include the inability to achieve satisfactory toner bonding on a large variety of paper products used to make such documents. For example, after imaging negotiable documents such as payroll checks, money orders, gift certificates, etc., the printed characters may flake off or otherwise be removed during normal handling and sorting operations in automated machinery.

Additionally, because of the lack of strong adherence of toner to paper, documents printed using noncontact printers are subject to deliberate alteration by counterfeiters, forgers, and the like. For example, check amounts and/or payee information may be readily lifted off by using pressure sensitive adhesive tape and new amounts substituted by the unscrupulous. While it may be possible to adjust the heat and/or pressure fusing steps which adhere the toner particles to paper as the information is printed, care must be taken not to overheat or melt the toner particles or scorch the paper stock. Still, it may be possible to alter such documents without leaving any visible indication of such alteration.

Accordingly, there is still a need in the art for a business document having security features which provide enhanced toner and ink adhesion for documents printed with noncontact as well as impact printing devices and which also provide a visible indication of attempted alterations of a document through the application of solvents, mechanical abrasion, pressure, or heat.

SUMMARY OF THE INVENTION

The present invention meets that need by providing a security coating for business documents printed using noncontact as well as impact printing devices which enhances the adhesion of toner particles and ink to a document substrate. Other security features may also be added to the coating to provide a dual-function coating which also provides visible evidence of tampering, either by the application of solvents, mechanical abrasion, heat, or when pressure is applied. Such a feature may also be used as an authentication device for a document.

In accordance with one aspect of the invention, a coated sheet or web is provided and comprises a sheet or web substrate, having a coating on at least a portion of one surface of the substrate which enhances the adhesion of the toner or ink to the coated surface of the substrate. The coating comprises a polymeric matrix which accepts the toner or ink and causes it to be bound more securely to the surface of the substrate. As a measure of the ability of the polymeric matrix to improve toner or ink adhesion, an adhesive tape test is provided to compare the density of a printed image on the substrate before and after the tape is applied and removed.

The polymeric matrix is effective such that after the toner or ink has been fixed onto the web by printing, the toner or ink is retained on the coated surface in an amount greater than the amount of toner retained on an uncoated surface of the substrate after the coated and uncoated surfaces have been subjected to a tape test. Preferably, the polymeric matrix is effective such that at least 80% of the toner or ink is retained on the substrate after a tape test, and most preferably, at least 95–99% of the toner is retained. The polymeric matrix coating is present on the substrate in an amount to yield a dry coating weight of between about 0.3 to 2.0 lbs per ream (17"×22", 500 sheets).

While the polymeric matrix enhances the adhesion of toner or ink to the document substrate so that toner or ink will not flake or peel from the document during normal handling operations (including routing the document through automated equipment) it may be desirable to include one or more additional features to deter attempts to alter the printing on the document or to provide an authentication feature to the document. In one embodiment of the invention, the polymeric matrix includes therein a chromogen and an agent capable of activating the chromogen to form a visible color when the sheet or web is subjected to attempted tampering or alteration through the application of solvents, pressure, mechanical abrasion, or heat.

For purposes of this invention, a chromogen may be considered to be a composition which is either initially colorless or which is made to appear initially colorless to the eye, but which can be activated to form a visible colored image or spot. The chromogen is preferably selected from the group consisting of solvent soluble dyes and dye precursors, such as for example, leuco dyes. The solvent soluble dyes may be made to appear colorless to the eye by grinding the dyes into small particles and dispersing them in the polymeric matrix.

Where an initially colorless dye precursor is used as the chromogen, the agent for activating the chromogen comprises a color developer for the dye precursor. For example, acid-activated clays and phenolic resins are well-known developers for leuco dyes. Where the chromogen comprises solvent soluble dye particles, the activating agent includes a solvent for the dye particles. The solvent may be encapsulated or present in solid form and dispersed in the polymeric matrix.

In another embodiment, the chromogen may be in the form of an encapsulated dye precursor, with the activating agent being a color developer which is also present in the polymeric matrix in the form of dispersed solid particles or as an encapsulated liquid. A solvent for either or both of the color former and color developer may also be present in the coating. The coating may be applied to the entire surface or surfaces of the substrate, to only a portion of one or both surfaces, or applied as a series of covert images containing the security features to one or both surfaces of the substrate.

Accordingly, it is a feature of the present invention to provide a security coating for business documents printed using impact or noncontact printing devices which enhances the adhesion of toner particles or ink to a document substrate. It is another feature of the present invention to provide a dual-function coating which also provides visible evidence of tampering, either by the application of solvents, mechanical abrasion, heat, or when pressure is applied. This, and other features and advantages of the present invention, will become apparent from the following detailed description, the accompanying drawings, and the appended claims.

DETAILED DESCRIPTION OF THE PREFERRED EMBODIMENTS

Figure 1:
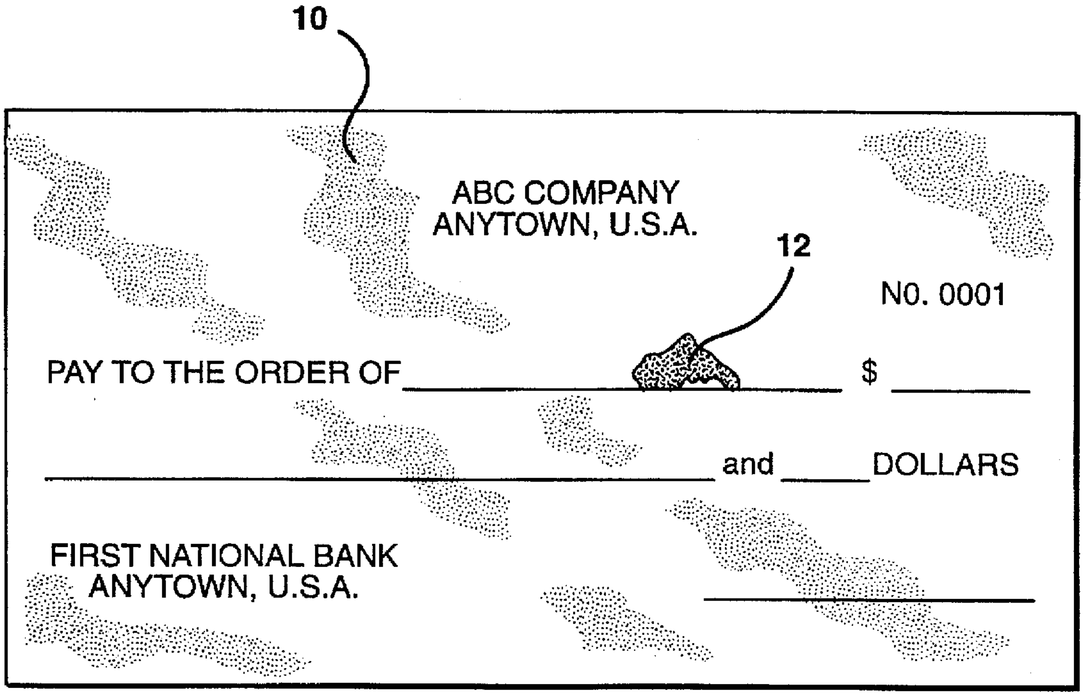
FIG. 1 is a plan view of a business document illustrating one aspect of a security coating of the present invention.

The security coating of the present invention provides the capability to use high speed noncontact printing devices for printing a variety of business documents such as checks, money orders, negotiable certificates, or other documents of value while providing a means of detecting fraudulent alteration of such documents. Alternatively, the security features of the present invention may be used to authenticate a document such as, for example, providing an area on the document which can be rubbed, pressed, or heated to bring up a visible color, symbol, or word which serves as the authentication.

While, heretofore, the toner particles deposited onto printed documents and fixed there by the noncontact printing devices has been less than satisfactory for a number of reasons, the security coating of the present invention improves the adhesion of toner particles to a document. Further, the addition of other security features to the coating renders information printed on the business documents of the present invention more resistant to defacement and/or intentional alteration by the application of solvents, pressure, or mechanical abrasion by providing a visible indication on the document.

While the security coating of the present invention renders documents receptive to the toners used by noncontact printing devices, it should also be appreciated that the coated document surface is also receptive to being printed upon by a variety of conventional impact printing devices using ink or transfer ribbons. In combination with the other security features of the invention, a dual-function security coating is provided which is useful for business documents printed using conventional impact printing processes as well.

The polymer chosen as the matrix binder should be compatible with the color formers and color developers and/or crystalline solvents which comprise an additional security feature of certain embodiments of the coating. The polymeric matrix binder should also be compatible with the various types of toners used with laser and ion deposition printers. Generally, the polymer or polymers chosen should be thermoplastic in nature, have glass transition temperatures in the general ranges of from about −30° C. to +30° C., and exhibit a suitable compatibility with the binders used in commercial toners and inks used in commercial ribbons. While not wishing to be bound by any specific theory or mechanism, it is believed that the toner/binder or ink becomes bound to the surface of the coated substrate by wetting the surface of the polymer and/or there is limited mechanical (cold) flow of the polymer around the toner or ink.

Polymers useful in the practice of the present invention include homopolymers or copolymers of ethylene and propylene, including olefin waxes, copolymers of acrylic acid and ethylene, copolymers of acrylic acid and vinyl acetate, copolymers of acrylic acid and styrene, homopolymers or copolymers of acrylic acid esters such as methacrylate, ethacrylate and butylacrylate, copolymers of styrene and butadiene, terpolymers of styrene, butadiene and acrylic acid, alkyd resins, phenolic resins, polyvinyl alcohols, copolymers of ethylene and vinyl acetate, copolymers of ethylene and vinyl chloride, copolymers of ethylene and vinylidene chloride, acrylonitriles, and terpolymers of ethylene, vinyl chloride, and vinyl acetate.

One class of polymers which is preferred for use as the polymeric matrix on documents to be printed in laser printers utilizing both heat and pressure to fuse the toner to the substrate comprises several acrylic emulsions available from S. C. Johnson & Sons, Inc. under the trademark Joncryl. Such emulsions are available as about 40–60% solids compositions and provide a continuous film on the coated substrate as well as assist in binding toner particles to the surface. The coating also preferably contains from about 1 to 5% by weight of a zinc oxide solution containing 8% to 16% zinc as a crosslinking agent for the acrylic polymer. The zinc is preferably added to the polymer emulsion in the form of an ammoniated zinc oxide solution. After crosslinking, the zinc provides the dried polymeric film with wet rub resistance, or resistance to smearing when the substrate is wet. Ammonium zinc carbonate may also be added from about 1 to 5% by weight to improve wet rub resistance of the dried film.

Where the documents are to be printed using ion deposition printers where the toner is transfixed to the substrate using pressure only, a preferred class of polymers comprises carboxylated styrene-butadiene latexes commercially available from The Dow Chemical Company under the designations Dow 615 NA and Dow 620 NA. Other suitable polymeric latexes include an acrylic latex emulsion available from Morton-Thiokol, Inc. under the designation Lucidene 604, a phenolic resin available from Schenectady Chemicals under the designation HRJ 4002, an alkyd resin dispersion available from National Lead Chemicals under the designation 580-W-45, a polyethylene emulsion available from Michelman, Inc. under the designation Michelube 687, a polyethylene/paraffin wax emulsion available from Johnson Wax Company under the designation Jon Wax 120, a styrene-butadiene latex available from Goodyear Tire and Rubber Company under the designation Goodrite 1800X73, and a polyvinyl alcohol available from Air Products and Chemicals, Inc. under the designation Vinol 107.

The polymeric matrix binder may also include small amounts of optional additives including an electrolyte such as sodium chloride to adjust the volume resistivity of certain cellulosic substrates. Other optical additives include antioxidants, optical brighteners, and fillers.

Any of several grades and weights of commercially available paper substrates may be used. For example, bond papers, calendared papers, safety papers, and opaque white papers available from a number of commercial sources are all suitable for use. The polymeric matrix is preferably applied to the web or sheet substrate as an aqueous solution or emulsion containing about 40–60% solids. The solution as applied preferably has a relatively low viscosity in the range of from about 20–25 cps (as measured by a #1 spindle Brookfield viscosimeter at 60 rpm and 75° F.) which renders it readily coated onto cellulosic webs or sheets by any of a number of conventional techniques.

Such coating techniques include, for example, offset gravure coating, direct blade coating, roll coating, and air knife coating. Further, the coating may be applied directly on a paper making machine to the cellulosic web such as by a size press, a gate roll, a twin gate roll, blade, or bill blade roll coater. The coating may be applied to one or both sides of the web.

Further, through the use of known techniques, the coating may be spot-coated onto only certain predetermined areas of a sheet or web. The polymeric emulsion is preferably applied in a pattern or printed as indicia which can easily be detected if the surface is physically or chemically altered. Once applied to a document, the polymeric coating may be dried by conventional methods such as impinged air, radiant infrared, and heat drums. The coating dries to a hard, flexible film which resists blocking or sticking to adjacent substrate plies after application and drying.

Additional security features may be added to the polymeric matrix on the substrate to provide a business document which will exhibit a visible indication of any attempts to alter its content either through the application of solvents (to remove toner or ink), pressure, heat, or mechanical abrasion. The specific additional security features added to the polymer coating may vary depending upon the intended end use of the document. In its broadest sense, the security features include a chromogen and an agent capable of activating the chromogen embedded in the polymeric matrix to form a visible color when an attempt at alteration is made.

In one embodiment, the security feature includes a blend of a microencapsulated, initially colorless chromogen in the form of a dye precursor and a particulate color developer. Suitable dyes for use in this embodiment include any of the initially colorless dye precursors heretofore used in this art and includes the colorless leuco dye precursors such as Crystal Violet Lactone, Benzoyl Leuco Methylene Blue, Indolyl Red, Malachite Green Lactone, 8'-methoxybenzoindoline spiropyran, and Rhodamine Lactone. The dyes may also be selectively mixed to form other desired primary colors. A compatible oil is used with the dye precursors and preferably comprises an alkylated naphthalene or biphenyl.

The dye precursors and oil may be microencapsulated by conventional techniques. The microcapsules preferably have a diameter of about 2 to 10 μm, as capsules less than 2 μm tend to form weak color while microcapsules greater than 10 μm in diameter tend to break during normal handling operations, causing premature color development. Suitable capsule wall materials are disclosed in U.S. Pat. No. 5,401,577 to Seitz, the disclosure of which is hereby incorporated by reference. The resulting microcapsules must be able to withstand a laser fuser roll temperature of from 350° F. –450° F. (176.7° C. –232.22° C.) and pressures of up to 40 psi (2.8 kg/sq.cm) for 1 to 2 seconds to avoid premature coloration during printing.

As the color developer, any of the developers heretofore used in this art may be utilized. A preferred color developer for use in this embodiment is an aqueous dispersion of an alkylphenol resin, which has also been found to slightly increase the toner adhesion of the polymeric matrix binder. The alkylphenol resin preferably comprises from 8 to 20 dry parts by weight of the coating based on 100 dry parts by weight of the polymeric emulsion.

In another embodiment, the security features comprise an initially colorless dye precursor, a color developer for the dye precursor, and a solvent in solid particulate form. The solvent may comprise certain natural and synthetic polymers as well as any long-chain hydrocarbon having a melting point above about 60° C. so that it is a solid at ambient temperatures. Suitable solvents include cetyl alcohol, natural rosins, esters of maleic anhydride, copolymers of esters of maleic anhydride, and copolymers of fatty acids or alcohols. The solid solvent, which may take a crystalline form, is preferably ground as an aqueous dispersion into particles having diameters of approximately 2 to 4 microns.

The use of solid solvent particles performs the function of a "co-solvent" in the coatings, allowing the security features of the coating to show attempted alteration on the document by the use of a wider variety of solvents than previous security coatings in which the chromogen is typically activated only by oxygen-containing solvents. However, with the use of a solid co-solvent, aliphatic and aromatic solvents, as well as oxygen containing solvents, will activate the chromogen to produce a visible color.

Further, by suitable selection of the solvent to have a relatively low melting point (e.g., 60° C.), the heat generated by mechanical abrasion or attempted erasure of the printing on the document will cause the solvent to melt and activate the chromogen. Solid solvents having different melting points may be blended together so that upon melting of the lower melting point solvent, it will act to solubilize the higher melting point solvent and activate the chromogen.

To increase the range of sensitivity of the security features even further, a hypochlorite sensitive compound such as amino benzyl thiozol may also be included. This compound provides protection against the use of hypochlorite agents which could damage the activating agent and leave the document susceptible to alteration by solvents. Diphenyl guanidine may also be added, together with the amino benzyl thiozol.

The chromogen may also comprise a solvent soluble dye contained in particulate or encapsulated form at about 0.5 to 5% by weight of the total dry coating. The solvent soluble dye functions to widen the range of solvents which can activate the security features of the coating. By using the dye in particulate form, the particles having an average diameter of about 0.3 to 50 μm, the particles exhibit little or no color to the eye. However, once exposed to a solvent for the dye, the dye exhibits strong and visible coloration. Suitable solvent soluble dyes include the class of dyes identified as solvent dyes by the American Textile Colorists and Chemists Color Index. Preferred dyes are those having high tinctorial strength, water insolubility, and solubility in a wide range of solvents. Suitable solvent soluble dyes include dyes from the families of anthraquinone, phthalocyanine, azo, azine, xanthane, triphenyl methane and indophenol. Examples of preferred solvent soluble dyes include Solvent Blue 4, Solvent Red 24 and Solvent Blue 70. Solvent Blue 4 has a C.I. Color Index Number 44045:1 and Solvent Red 24 (Sudan IV) has a C.I. Color Index Number 26105. Both of these dyes are preferred because of their water insolubility as well as their ability to impart strong color on a substrate when contacted with a solvent.

In yet another embodiment, the security feature includes a solvent soluble dye as the chromogen and a solvent in solid particulate form dispersed in the polymer matrix. In this embodiment, the application of another solvent which either directly solubilizes the dye, or solubilizes the solid solvent particles which in turn solubilize the dye, will activate the solvent soluble dye to form a visible color. The heat generated from attempted erasure or other mechanical abrasion will melt the solid solvent and solubilize the dye. Suitable dyes and solvents for use in this embodiment are as described above. Both of these embodiments which use solid solvent particles may be used in combination with the toner adhesion-enhancing polymer matrix coating or may be used separately as a document security feature. The solid solvent particles may also be used in combination with other matrix coatings.

Referring now the drawings, a security-coated business document is illustrated in accordance with the invention. As will be appreciated, FIGS. 1 and 3 may represent more than one embodiment of the invention. As illustrated in FIG. 1, a document is shown which has been coated on its entire surface (representatively) with a coating 10, which, in one embodiment, comprises the polymeric matrix binder and an encapsulated leuco dye and color developer. When a solvent is used in an attempt to remove toner or inked images from the document, such as the payee or amount of a check, the solvent causes the microcapsule walls to dissolve, permitting the leuco dye to react with the color developer in the coating and form a visible colored spot 12. Alternatively, the application of pressure or mechanical abrasion will also cause the microcapsule walls to break, also resulting in the formation of a colored spot 12.

Figure 2:
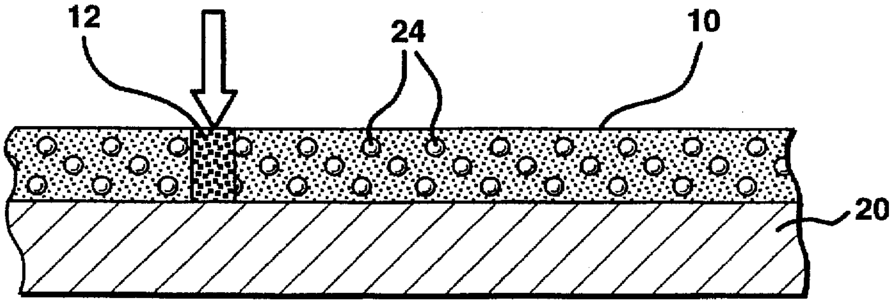
FIG. 2 is a fragmentary sectional view of the surface of a business document illustrating the formation of visible color in response to pressure by a security coating of the present invention.

As shown in FIG. 2, when pressure is applied to the document in an attempted alteration as indicated by the arrow, the microcapsules 24 will rupture, releasing the dye precursor and oil to react with the color developer, for example, a particulate alkylphenol resin dispersed in coating 10, forming a visible colored spot 12 in the area beneath where pressure has been applied as shown and producing a clear indication of an attempted alteration.

Figure 3:
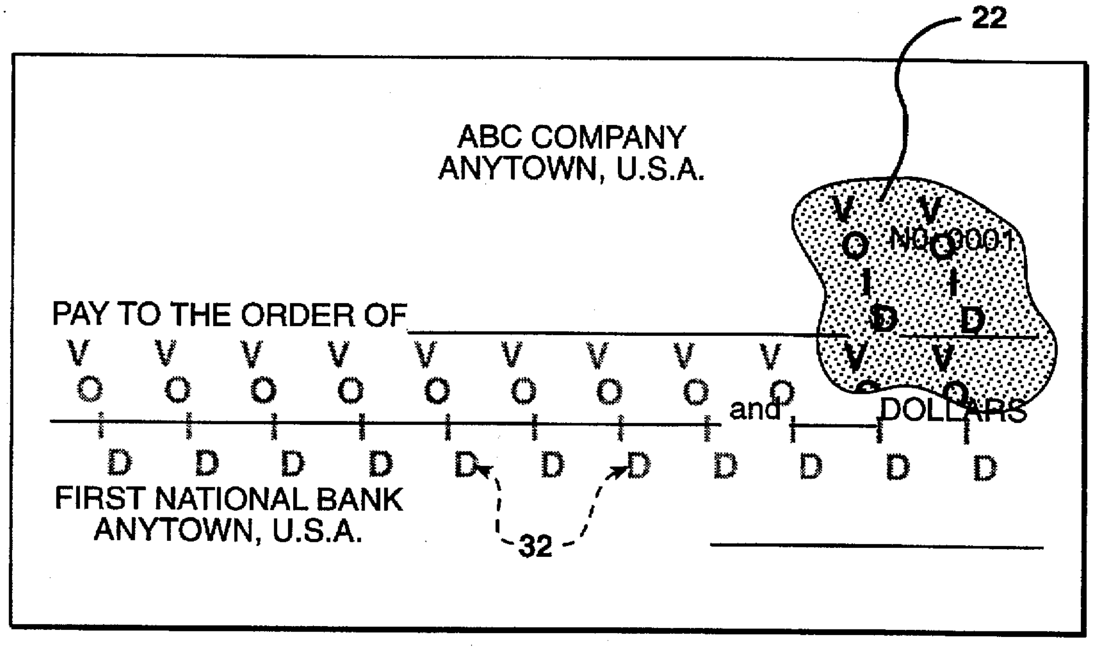
FIG. 3 is a plan view of a business document illustrating another aspect of a security coating of the present invention printed as covert warning indicia.

FIG. 3 illustrates an alternative embodiment of the invention in which the coating has been printed as a covert image, in this instance the warning phrase VOID. The words formed by the coating 32 are virtually invisible because of the initially colorless state of the chromogen, but if alteration of the coated portion of the document is attempted such as with the use of a solvent shown in area 22, the warning words become visible. In embodiments where the security feature in the coating comprises a dispersed leuco dye, color developer, a solid particulate solvent, or a solvent soluble dye, the use of a solvent will either dissolve the solvent dye which forms a color, or dissolve the leuco dye and/or the color developer which activates the leuco dye, or dissolves the solid solvent which in turn dissolves either or both the solvent soluble dye or leuco dye to form a visible color.

While illustrated as a covert warning phrase in FIG. 3, it will also be apparent that a covert authentication color, symbol, or word may be printed on the document. For example, instructions on the document or provided to an appropriate official may instruct that the document be heated in a certain location, with color formation indicating authenticity of the document.

In embodiments where the security feature comprises a solvent soluble dye and a solid particulate solvent, mechanical abrasion, such as by erasure or rubbing of the document, will heat the coating such that the solid solvent particles will melt and dissolve the solvent soluble dye. Alternatively, where a solvent is applied, the solvent soluble dye will dissolve and form a visible color.

In order that the invention may be more readily understood, reference is made to the following examples which are intended to illustrate the invention, but not limit the scope thereof.

EXAMPLE 1

A dual-function security coating was prepared in accordance with the present invention by separately preparing components a) and b) as described below:

a) Polymeric dispersion

The following components were blended together:

| | Parts by Weight |
|---|---|
| HRJ 4023[1] | 11.0 |
| Joncryl 77[2] | 125.0 |
| Zinc Oxide solution[3] | 4.9 |
| water | 10.0 |

[1]aqueous dispersion of alkyl phenol resin from Schnectedy Chemical Co.
[2]46% solids polymer emulsion from S. C. Johnson Co.
[3]15% solids ammoniated aqueous solution from S. C. Johnson Co.

b) Solids dispersion

A 59% solids dispersion of microcapsules was prepared using the following ingredients in accordance with U.S. Pat. No. 5,204,184, the disclosure of which is hereby incorporated by reference:

| | Percent by Weight |
|---|---|
| KMC-113[1] | 33.8 |
| Pergascript Blue 12G[2] | 1.2 |
| Pergascript Red 16B[3] | 0.9 |
| Reakt Red 448[4] | 0.3 |
| Baymicron 2107[5] | 3.3 |
| Gelatin | 0.7 |
| ACP 1033[6] | 1.8 |
| Diethylene triamine | 0.7 |
| Geomeg 104[7] | 15.4 |

-continued

| | Percent by Weight |
|---|---|
| Stabilizers and biocide | 0.9 |
| Water | 41.0 |

[1]solvent from Kreha Corp. of America
[2]leuco dye from Ciba Geigy Co.
[3]leuco dye from Ciga Geigy Co.
[4]water soluble dye from BASF Corp.
[5]isocyanate wall-forming material from Bayer Corp., Industrial Chemicals Division
[6]colloid from International Specialty Products
[7]diluent from Grain Processing Corp., Horizon Products Division Components a) and b) were then blended together using the entire batch of component a) (150.9 parts) and 20.1 parts of component b). Water was then added to adjust the total solids content to 42%.

The resulting dual-function security coating was then applied to a 24# uncoated paper base stock web using a flexographic printing apparatus. The coating was applied to yield a dry coating weight of approximately 1.3 lb/ream (4.9 gm/$m^2$) (17"×22", 500 sheet). The coating on the samples was then allowed to dry.

The dual-function security coating was then tested for its effectiveness in bonding a fused toner image to coated paper stock. For comparison, an uncoated 24# bond paper was also printed with a fused toner image and tested. The test was performed using a pressure sensitive tape (type 810, available from 3M Company) which was applied over the toner image and then rolled over once with a 1000 gram weight. The tape was then immediately peeled away at a 135° angle.

The amount of toner removed by the test was measured by comparing the density of the initial image with the density of the final image to provide an average density ratio (AvDR) defined as $$AvDR = \frac{\text{Initial Density}}{\text{Final Density}} \times 100$$

A Macbeth Answer II densitometer was used to make the measurements, and a minimum test area of 3 $mm^2$ was used. Samples were printed using a Xerox 4050 Laser Printer, and the results are reported below.

| | Initial | Final | AvDr |
|---|---|---|---|
| Control Sample (untreated) | 1.385 | .635 | 45.8 |
| Sample w/coating | 1.394 | 1.338 | 96.0 |

Additional samples were printed using an IBM 4039 laser printer. The results are reported below.

| | Initial | Final | AvDr |
|---|---|---|---|
| Control Sample (untreated) | 1.371 | 1.31 | 95.6 |
| Sample w/coating | 1.41 | 1.40 | 99.3 |

As can be seen, a marked improvement in toner retention is provided by the dual-function security coating of the present invention.

EXAMPLE 2

A solvent and heat sensitive security coating was made by blending together the following and then coating it on a paper sheet:

| Ingredient | % by weight |
|---|---|
| Pengloss 115[1] | 30 |
| Geomeg 104[2] | 7 |
| Hydrocarb 90[3] | 7 |
| 50% solids disp. of Solvent Red 24 (dye) | 3 |
| 50% solids disp. of p-benzyl biphenyl (solid solvent) | 35 |
| PVP K-90[4] | 3 |
| Rhopaque OP84[5] | 15 |

[1]45% solids starch solution from Pennford Products Co.
[2]diluent from Grain Processing Corp., Horizon Products Division
[3]dry powder filler from Omya, Inc.
[4]polyvinylpyrrolidone from ISP Technologies, Inc.
[5]whitener from Rohm & Haas Co.

EXAMPLE 3

A solvent and heat sensitive security coating was made by blending together the following and then coating it on a paper sheet:

Solution 1 was made by blending together 50 grams of Carboset 1915 (trademark), a binder available from B. F. Goodrich; 150 grams of water; and 200 grams of Pergascript Red I6B, a leuco dye available from Ciba-Geigy, ground in an attritor to have a particle size in the range of from 1–5 μm. Solution 2 was made by blending together 50 grams of Carboset 1915; 150 grams of water; and 200 grams of TG-SA (trademark), a color developer available from Nagase, ground in an attritor to have a particle size in the range of from 1–5 μm. Solution 3 was made by blending together 50 grams of Carboset 1915; 150 grams of water; and 200 grams of cetyl alcohol solid solvent ground in an attritor to have a particle size in the range of from 1–5 μm.

A solvent sensitive security coating was made by combining 30 grams of binder (Pengloss 115 grafted starch), 20 grams of water, 7 grams of rice starch, 3 grams of PVP K30 (ISP Technologies, Inc.), 10 grams of Solution 1, 15 grams of Solution 2, and 15 grams of Solution 3. The coating was applied as a full coating to a paper substrate by a flexographic printing unit using a 200 line anilox roll and approximately 7.5 BCM cell volume. The security coating on the substrate was sensitive to a wide variety of solvents (as shown by the development of color in those areas where solvent was applied).

EXAMPLE 4

To further widen the sensitivity of the security coating, a solvent soluble dye and a hypochlorite sensitizer were added to form a second security coating as follows: 27 grams of binder (Penngloss 115 starch), 15 grams of water, 7 grams of a 28% aqueous solution of Chlorostain OR, an amino benzyl thiazol available from Bayer, 1 gram of Solvent Red 24, 7 grams of rice starch, 3 grams of PVP K30, 10 grams of Solution 1, 15 grams of Solution 2, and 15 grams of Solution 3 (solutions 1, 2 and 3 from Example 3) were all blended together and coated using the same flexographic printing unit. Again, the security coating had a wide range of sensitivities to a variety of solvents including hypochlorites.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A coated sheet or web useful with noncontact printers using toner particles or impact printers using ink-containing ribbons comprising a sheet or web substrate, and a coating on at least a portion of one surface of said substrate which enhances the adhesion of said toner or ink to the coated surface of the substrate, said coating comprising a polymeric matrix, wherein after said toner or ink has been fixed onto said web by printing, said toner or ink is retained on said coated surface in an amount greater than the amount of toner or ink retained on an uncoated surface of said substrate after said coated and uncoated surfaces have been subjected to a tape test, and wherein said coating is present on said substrate on a dry weight basis in an amount of between about 0.3 to 2.0 lbs per ream.

2. A coated sheet or web useful with noncontact printers using toner particles or impact printers using ink-containing ribbons comprising a sheet or web substrate, and a coating on at least a portion of one surface of said substrate which enhances the adhesion of said toner or ink to the coated surface of the substrate, said coating comprising a polymeric matrix, wherein after said toner or ink has been fixed onto said web by printing, said toner or ink is retained on said coated surface in an amount greater than the amount of toner or ink retained on an uncoated surface of said substrate after said coated and uncoated surfaces have been subjected to a tape test, said polymeric matrix including therein a chromogen and an agent capable of activating said chromogen to form a visible color when said sheet or web is subjected to attempted tampering or alteration through the application of solvents, mechanical abrasion, or heat, and wherein said coating is present on said substrate on a dry weight basis in an amount of between about 0.3 to 2.0 lbs per ream.

3. A coated sheet or web as claimed in claim 2 in which said chromogen is selected from the group consisting of dye precursors and solvent soluble dyes.

4. A coated sheet or web as claimed in claim 2 in which said chromogen comprises a dye precursor and said agent for activating said chromogen comprises a color developer for said dye precursor.

5. A coated sheet or web as claimed in claim 2 in which said chromogen comprises solvent soluble dye particles and said agent includes a solvent for said dye particles.

6. A coated sheet or web as claimed in claim 5 in which said solvent is encapsulated.

7. A coated sheet or web as claimed in claim 5 in which said solvent is in the form of solid particles.

8. A coated sheet or web as claimed in claim 2 in which said chromogen comprises an encapsulated dye precursor.

9. A coated sheet or web as claimed in claim 8 in which said agent comprises a color developer for said dye precursor.

10. A coated sheet or web as claimed in claim 9 further including a solvent for either said dye precursor or said color developer.

11. A coated sheet or web as claimed in claim 2 in which said coating is applied as a series of covert images to at least a portion of one surface of said substrate.

12. A security coated sheet comprising a sheet or web substrate which has been coated with a coating comprising a chromogen and an agent capable of activating said chromogen to form a visible color when said sheet or web is subjected to attempted tampering or alteration through the application of solvents, mechanical abrasion, or heat, and wherein said chromogen comprises solvent soluble dye particles, said agent includes a solid solvent for said dye particles in particulate form and wherein said coating is present on said substrate on a dry weight basis in an amount of between about 0.3 to 2.0 lbs. per ream substituted thereof.

13. A coated sheet or web useful with noncontact printers using toner particles or impact printers using ink-containing ribbons comprising a sheet or web substrate which has been coated on at least a portion of one surface thereof with a coating which enhances the adhesion of said toner or ink to the coated surface of the substrate, said coating comprising a polymeric matrix, said polymeric matrix including therein a chromogen and an agent capable of activating said chromogen to form a visible color when said sheet or web is subjected to attempted tampering or alteration through the application of solvents, mechanical abrasion, or heat; wherein said polymeric matrix, said chromogen and said agent have been applied to said substrate as a single coating, and wherein said coating is present on said substrate on a dry weight basis in an amount of between about 0.3 to 2.0 lbs. per ream.

* * * * *